(12) United States Patent
Keibach et al.

(10) Patent No.: US 11,828,671 B2
(45) Date of Patent: Nov. 28, 2023

(54) METHOD FOR DETERMINING THE MASS AND THE POSITION OF THE CENTRE OF GRAVITY OF AN ADDITIONAL LOAD OF A MOVEMENT SYSTEM, IN PARTICULAR IN THE CASE OF A MACHINE TOOL

(71) Applicant: Franz Kessler GmbH, Bad Buchau (DE)

(72) Inventors: Bernd Keibach, Uttenweiler (DE); Manuel Fischer, Neufra (DE)

(73) Assignee: FRANZ-KESSLER GMBH, Bad Buchau (DE)

( * ) Notice: Subject to any disclaimer, the term of this patent is extended or adjusted under 35 U.S.C. 154(b) by 172 days.

(21) Appl. No.: 17/253,022

(22) PCT Filed: Aug. 21, 2019

(86) PCT No.: PCT/EP2019/072370
§ 371 (c)(1),
(2) Date: Dec. 16, 2020

(87) PCT Pub. No.: WO2020/038995
PCT Pub. Date: Feb. 27, 2020

(65) Prior Publication Data
US 2021/0223130 A1 Jul. 22, 2021

(30) Foreign Application Priority Data

Aug. 21, 2018 (DE) .......................... 102018006612.7

(51) Int. Cl.
G01M 1/12 (2006.01)
B23Q 17/20 (2006.01)
G01M 1/10 (2006.01)
(52) U.S. Cl.
CPC ............. *G01M 1/122* (2013.01); *B23Q 17/20* (2013.01); *G01M 1/10* (2013.01)

(58) Field of Classification Search
CPC .......... G01M 1/10; G01M 1/122; B23Q 17/20
See application file for complete search history.

(56) References Cited

U.S. PATENT DOCUMENTS

2014/0144256 A1* 5/2014 Jha ........................... G01M 1/16
73/865
2015/0186556 A1* 7/2015 Murota ................... G06F 30/00
703/1

(Continued)

FOREIGN PATENT DOCUMENTS

CN 102794670 A 11/2012
DE 29622132 U1 3/1998

(Continued)

OTHER PUBLICATIONS

International Search Report issued for European Patent Application No. PCT/EP2019/072370 dated Nov. 27, 2019.

(Continued)

*Primary Examiner* — Natalie Huls

(57) ABSTRACT

The invention relates to a method for determining the mass and the center of gravity location of a load (10) of a moving system (12), particularly of a machine tool (14), which comprises a support (20) that is for accommodating the load (10) and is able to rotate around a first axis (16) and a second axis (18) as well as electronically controlled drive units (22, 24) for rotating the support (20) around the first axis (16) and around the second axis (18), wherein a total moment of inertia and a holding torque with regard to the first axis (16) are determined in a loaded state;

a total moment of inertia and a holding torque with regard to the second axis (18) are determined in the loaded state; and the mass and the center of gravity location of the load (10) relative to the support (20) are determined based on the total moments of inertia and the holding torques with regard to the first axis (16) and second axis (18).

(Continued)

The invention also relates to a moving system (12), which is equipped to determine the mass and the center of gravity location of a load (10) according to such a method.

20 Claims, 2 Drawing Sheets

(56) References Cited

U.S. PATENT DOCUMENTS

| | | |
|---|---|---|
| 2016/0001373 A1 | 1/2016 | Tada |
| 2018/0104825 A1 | 4/2018 | Vulcano et al. |

FOREIGN PATENT DOCUMENTS

| | | |
|---|---|---|
| DE | 102009056492 A1 | 6/2011 |
| DE | 102015201439 A1 | 7/2016 |
| DE | 102015113890 A1 | 2/2017 |
| DE | 102016104146 A1 | 9/2017 |
| DE | 102017104831 A1 | 9/2017 |
| EP | 2735928 A1 | 11/2012 |
| KR | 1020110061025 A | 6/2011 |

OTHER PUBLICATIONS

Search Report Issued by the German Patent Office for German Application No. 102018006612.7, dated Jul. 5, 2019.
Office action issued by the Chinese Patent Office for Chinese Patent Application No. 201980039402.3, dated Mar. 1, 2023.
Bachelor's thesis, Manual Josef Fischer, "Development of a Concept for Integrated Mass Determination the Payload for Rotary, Milling and Rotary Swivel Tables," Feb. 2017.
Office action issued by the Chinese Patent Office for Chinese Patent Application No. 201980039402.3, dated Aug. 23, 2023.

\* cited by examiner

METHOD FOR DETERMINING THE MASS AND THE POSITION OF THE CENTRE OF GRAVITY OF AN ADDITIONAL LOAD OF A MOVEMENT SYSTEM, IN PARTICULAR IN THE CASE OF A MACHINE TOOL

The invention relates to a method for determining the mass and the center of gravity location of a load of a moving system, particularly in a machine tool, which is equipped to determine the mass and the center of gravity location of a load according to such a method, particularly in a machine tool.

The mass and the relative position of a workpiece in a holder or on a table of a moving system such as a swivel/rotation table of a machine tool have a decisive influence on the precision of a position control, particularly in the case of axes that are gravity-loaded. Basically, the mass and the center of gravity location of a workpiece can be determined manually whereupon a control method can be correspondingly adapted to take into account the mass and the center of gravity location in a position control.

For example, according to DE 10 2015 113 890 A1 and according to US 2016/0 001 373 A1, a compensation of the forces that occur takes place as a function of a workpiece position and a workpiece mass, with these being input in advance as preset values.

DE 10 2016 104 146 A1 has also disclosed a method that permits a determination of the mass and the center of gravity location of a workpiece on a workpiece support of a workpiece receiving unit, which can be moved in linear fashion and can be rotated around two rotational axes that are oriented at right angles to each other. The mass of the workpiece positioned on the workpiece support in this case is determined by accelerating the workpiece in linear fashion as a test. The mass is determined based on the resulting force determined. In addition, the center of gravity location of the workpiece is determined by uniform rotation of the workpiece around one of the respective rotation axes. In the case of an eccentric position of the workpiece and/or its center of gravity, a periodically varying drive torque on the respective drive unit is produced, whose magnitude and phase position can be used to determine the coordinates of the center of gravity.

The object underlying the present invention is to permit the simple and reliable determination of the mass and the center of gravity location of a load of a moving system.

The object is attained according to the invention by means of a method with the features of claim 1 and by a moving system that operates according to this method. Modifications of the invention can be inferred from the dependent claims.

A method for determining the mass and the center of gravity location of a load of a moving system is proposed, which comprises a support that can be rotated around at least one first axis and one second axis for accommodating the load as well as electronically controlled drive units for rotating the support around the first axis and the second axis. A total moment of inertia and a holding torque with regard to the first axis are determined in a loaded state. A total moment of inertia and a holding torque with regard to the second axis are also determined in the loaded state. Furthermore, the mass and the center of gravity location of the load relative to the support are determined based on the total moments of inertia and the holding torques with regard to the first axis and the second axis.

The invention also includes a moving system, which comprises a load-accommodating support that can be rotated around at least one first axis and one second axis. The moving system also comprises electronically controlled drive units for rotating the support around the first axis and the second axis. The moving system furthermore comprises a control unit, which is equipped to determine a mass and a center of gravity location of the load according to the above-mentioned method.

The method according to the invention and the moving system according to the invention make it possible to simply and reliably determine a mass and a center of gravity location of a load. Both the mass and the center of gravity location can be determined in a loaded state. This makes it possible to avoid an additional measurement step that precedes a clamping of a load. In addition, a high degree of manufacturing precision can be achieved. When machining a workpiece, its mass and center of gravity location can be simply and reliably taken into consideration in a position control without requiring costly adjusting procedures in advance. In addition, it is possible to determine the mass and the center of gravity location for any desired load, for example one with a geometry and/or mass distribution that is asymmetrical. It is also easily possible to perform an adaptation for workpieces with anisotropic density. Because the method according to the invention can be easily automated, it is also possible to avoid operator error and to compensate for an imprecise, in particular eccentric, clamping. A compensation can also be achieved in a reliable way if the geometry and/or nature of a workpiece or the desired type of machining makes it necessary to position the workpiece eccentrically. Furthermore, during a machining, it is possible to carry out a readjustment in a simple and reliable way, for example if a geometry and/or a density and/or a position of a workpiece have changed due to a machining. Such a readjustment can take place without having to remove the workpiece from the moving system for a new measurement.

The moving system can be part of a machine tool, for example a machine tool for machining a workpiece, e.g. for material-removing machining, for surface treatment, for laser machining, for further processing, or the like. In this case, the support is positioned in the machine tool so that a load positioned on the support is positioned in a machining chamber of the machine tool. The load can be a workpiece that is to be machined. By means of the moving system, it is preferably possible to change a position of the load relative to a machining tool. In this case, it is possible according to the invention for the moving system to produce a rotation of the workpiece, which is sufficient for a machining by means of milling/turning. It is also possible according to the invention for the moving system to be used only for positioning, particularly in combination with a rotating tool.

In addition to the degrees of freedom defined by the first axis and the second axis, the moving system can have other degrees of freedom. For example, an additional linear mobility is possible according to the invention. A rotation and/or pivoting around at least one other axis is additionally possible according to the invention. The moving system can have other drive units for this purpose. In addition or alternatively, the machining tool can be rotated or pivoted around at least one other axis.

The electronically controlled drive units preferably comprise at least one first electric motor for producing a rotating motion around the first axis and/or a second electric motor for producing a rotating motion around the second axis. According to the invention, however, it is basically possible for a single electric motor to be used in combination with a suitable transmission of force in order to produce a rotation of the support around the first axis and around the second axis. It is also possible according to the invention for several electric motors to be provided for the first axis and/or for several electric motors to be provided for the second axis. In one embodiment of the invention, a rotation speed and/or a produced torque of at least one of the electronically controlled drive units is regulated. The control unit and/or the electronically controlled drive unit or units can have suitable control loops for this purpose.

The support preferably comprises a table top to which the load can be fastened, for example a machine table. The table top can comprise suitable fastening means and/or connecting points and/or mounting rails or the like for mounting and/or clamping the load. Preferably, the support is designed to be swappable so that for different loads, it is possible to simply use a suitable respective support.

Preferably, the total moment of inertia and/or the holding torque of the first axis in the loaded state can be determined in an automated fashion. The corresponding method step can thus be performed automatically by the control unit. In particular, no user inputs relating, for example, to a geometry and/or a mass and/or a density and/or a fastening position of the load are required for determining the total moment of inertia and/or the holding torque with regard to the first axis. Analogously to this, the total moment of inertia and/or the holding torque of the second axis in the loaded state are preferably determined in an automated fashion.

In addition, the mass and the center of gravity location of the load relative to the support are preferably determined in automated fashion, for example by the control unit, based on the total moments of inertia and the holding torques with regard to the first axis and the second axis.

The moving system and/or the machine tool can have a user interface by means of which user inputs for the control unit can be made. The user interface can be provided to request the automated determination of the mass and the center of gravity location. In addition, the user interface can be provided for inputting basic parameters, which comprise, for example, properties of the support used and/or of the electronically controlled drive units.

In the event that the support is swappable and differently designed supports can be used, it is possible according to the invention for the moving system to comprise a detection unit that can automatically detect the support that is being used. For this purpose, the detection unit can have sensors that are suitable for this, which are suitable for detecting features of the support that permit an identification of the support or support type. It is also possible according to the invention for a support type that is used to be input via the user interface.

A high precision of a movement of the moving system and/or a high degree of manufacturing precision can be achieved particularly if, after the mass and the center of gravity location of the load have been determined, the control unit is equipped to take them into consideration when moving and/or positioning the load. Such a consideration can comprise a request for a decreased or increased drive torque of the electronically controlled drive units, for example in order to compensate for influences on the positioning precision due to the gravitational pull acting on the load. Preferably, the determined mass and the center of gravity location are continuously taken into consideration in a machining of the load. If the mass and the center of gravity location are determined again after a partial machining, then the new mass and center of gravity location can be taken into consideration for a further machining.

In a preferred embodiment of the moving system, the system comprises a swivel/rotation table, the support being a workpiece table of the swivel/rotation table. The swivel/rotation table can be a so-called swivel bridge of the kind that are frequently used in machine tools. Alternatively or in addition, the support can be a chuck, which is able to rotate around the first axis and around the second axis. The support can also be a holder of any kind.

Preferably, the first axis is a rotational axis for the support and the second axis is a pivot axis for the support. In the case of a swivel/rotation table or a swivel bridge, the first axis is for example the rotation axis and the second axis is the pivot axis.

The first axis and second axis can be positioned perpendicular to each other. In addition, the first axis and second axis can extend spaced slightly apart from each other or can also intersect exactly. This is accompanied by advantages with regard to a control and a precision positioning. Basically, however, any other positions of the first axis relative to the second axis are possible according to the invention.

According to the invention, it is possible for the moving system to be equipped with suitable additional sensors in order to determine the total moments of inertia and/or the holding torques. For example, force sensors, rotation speed sensors, torque sensors, and the like can be used for this. A simple design and a high degree of reliability based on a low error susceptibility can be achieved, particularly if the total moments of inertia and the holding torques are determined based on variables that are available in control loops of the electronically controlled drive units without a use of additional sensors. As a result, it is unnecessary to provide additional sensors, which reduces costs and reduces a susceptibility to failure.

The mass and the center of gravity location can be determined in a precise and reliable way particularly if the variable that is available in the control loops of the electronically controlled drive units comprises at least an operating current and/or a rotation position and/or a rotation speed and/or an acceleration time. The variable can also comprise a plurality of parameters. The control unit can be equipped for detecting and/or processing the variable. For this purpose, it is also possible according to the invention for a chronological progression of the variable to be at least temporarily stored.

Errors due to excessively low signal strengths can be advantageously avoided and a high precision of a determination can be achieved, particularly if the holding torque of the first axis is determined in a position of the first axis in which the holding torque of the first axis is at its maximum. Alternatively or in addition, the holding torque of the second axis is determined in a position of the second axis in which the holding torque of the second axis is at its maximum. The method can comprise a method step in which the position of the maximum holding torque of the first axis is determined. The method can also comprise a method step in which the position of the maximum holding torque of the second axis is determined. The position of the maximum holding torque of the first axis can be a position in which the support is rotated around the second axis relative to a basic position of the support with regard to the second axis. Likewise, the position of the maximum holding torque of the second axis can be a position in which the support is rotated around the first axis relative to a basic position of the support with regard to the first axis. Preferably, the positions of the maximum holding torque for the first axis and second axis are determined through rotation around both axes. In this case, a position of maximum operating current of the corresponding electronically controlled drive unit can be identified as the position of the maximum holding torque. As mentioned above, however, another operating parameter and/or different operating parameters and/or at least one suitable sensor value can be used for identifying the position of the maximum holding torque. Alternatively, it is possible according to the invention for the holding torque of at least the first axis and/or second axis to be determined in a predetermined position of the respective other axis, which is established independent of the load and/or is based on a user input.

According to one embodiment of the invention, the holding torque of the first axis and/or second axis is determined in a position of the first axis in which the first axis is positioned perpendicular to a direction of gravity. The position of the maximum holding torque of the first axis in this case is preferably determined by rotating the load around the first axis while the first axis is positioned perpendicular to the direction of gravity. By means of this, a maximum holding torque of the first axis can be determined with high precision for any desired geometries and positions of the load.

Alternatively or in addition, the holding torque of the second axis can be determined in the position of the maximum holding torque of the first axis. In this position of the first axis, the first axis can be positioned perpendicular to the direction of gravity.

Preferably, in order to determine the respective total moment of inertia in the loaded state, an acceleration torque around the respective axis can be determined by rotating the load around the respective axis. In this case, the determination of the acceleration torque can take place with at least a predetermined operating current for the corresponding electronically controlled drive unit. It is thus possible to determine total moments of inertia in a simple way and with high precision.

A quick determination of the mass and the center of gravity location, which can be easily carried out for various loads, can be achieved particularly if at least one stored value of a moment of inertia of the unloaded support with regard to the first axis and/or of a moment of inertia of the unloaded support with regard to the second axis and/or of a mass of the unloaded support and/or of at least one geometrical measurement of the support is/are used to determine the mass and/or the center of gravity location of the load. The stored value can be a basic parameter that can be input via the user interface. The stored value can also be stored as a factory setting. In addition, it is possible according to the invention for the stored value to be selected automatically as a function of the detected type of support, for example by the control unit, for example from a stored lookup table.

Alternatively or in addition, it is possible according to the invention for at least one calibration step to be performed in an unloaded state of the support in which reference values are determined that are taken into consideration when determining the mass and the center of gravity location in the loaded state. By means of this, it is possible to take different support types into consideration. In addition, deviations based on ambient parameters can be taken into consideration. It is also possible to take into account a power fluctuation or a torque fluctuation of a drive unit, for example due to an aging and/or after maintenance, for example due to a change in running smoothness.

A center of gravity location can be determined in a precise way particularly if for at least one of the axes, at least three different angular positions can be approached, for each of which a respective holding torque is determined, wherein based on the holding torques for the different angular positions, an eccentricity of the load is determined. Holding torques can also be determined for a plurality of combinations of angular positions of the first axis and second axis. In this connection, a corresponding matrix with predetermined angular positions can be used as a starting point. It is also possible according to the invention that the angular positions to be approached are determined in advance, for example when searching for the position of the maximum holding torque of the first axis and/or second axis. For example, in this case, angular positions can be stored in a memory, for example a memory of the control unit, which contains predetermined percentages at the maximum holding torque.

As mentioned above, a progressing machining of the load can be taken into account particularly if the mass of the load is determined between machining steps of a machining of the load without changing a loading state of the load. It is thus possible to advantageously avoid an erroneous positioning due to a changing mass. It is also possible for a center of gravity location and/or a total moment of inertia to be determined repeatedly.

In the following, the present invention will be described by way of example based on the attached figures. The drawings, the description, and the claims contain numerous features in combination. The person skilled in the art will also suitably consider the features individually and unite them into other meaningful combinations. In the drawings:

Figure 1:
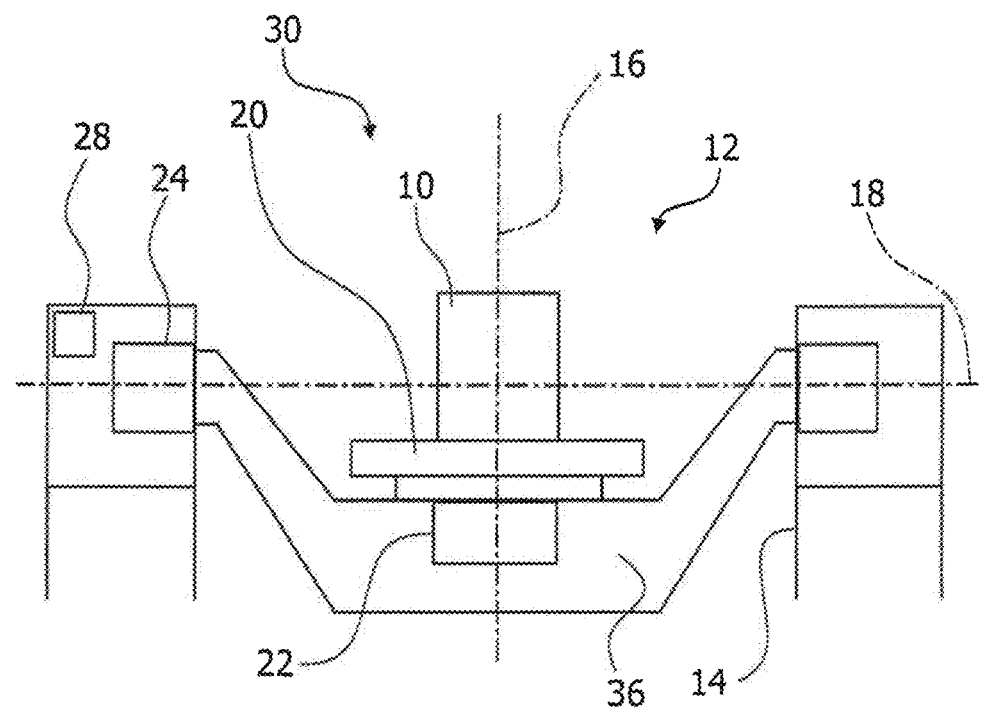
FIG. 1 shows a schematic side view of a moving system.

FIG. 1 shows a moving system 12 in a schematic side view. The moving system 12 comprises a support 20 for accommodating a load 10. The support 20 is able to rotate around a first axis 16 and a second axis 18. In addition, the moving system 12 has a first electronically controlled drive unit 22 for rotating the support 20 around the first axis 16. The moving system 12 also has a second electronically controlled drive unit 24 for rotating the support 20 around the second axis 18.

The moving system 12 also comprises a control unit 28, which is equipped to determine a mass and a center of gravity location of the load 10. This determination is made using a method that will be described in greater detail below.

In the case shown, the moving system 12 is part of a machine tool 14. The moving system 12 in this case is positioned in a machining chamber, not shown, of the machine tool 14. The load 10 is also a workpiece, which can be machined in the machining chamber by means of the machine tool 14.

The moving system 12 comprises a swivel/rotation table 30, which can also be referred to as a swivel bridge. The support 20 in this case is a workpiece table of the swivel/rotation table 30. By means of the swivel/rotation table 30, it is possible to change a position of the load 10 relative to a machining tool, not shown, of the machine tool 14, for example a milling tool, a drill bit, a laser head, a grinding tool, or the like. In the case shown, the control unit 28 is equipped to correspondingly trigger the electronically controlled drive units 22, 24. The control unit 28 can be connected to another control unit of the machine tool 14, which controls the machining tool. According to the invention, however, it is also possible for a shared control unit to be provided.

The first axis 16 is a rotation axis for the support 20. It is thus possible to adapt a rotation position of the load 10 by rotating the support 20 around the first axis 16. In the case shown, the first axis 16 extends through a center of gravity 32 of the support 20 (see FIG. 2). In this case, the support 20 is rotationally symmetrical.

The second axis 18 is a pivoting axis for the support 20. The second axis 18 in this case is positioned perpendicular to the first axis 16. A pivot position of the load 10 can be adjusted by rotating the support 20 around the second axis 18. The first axis 16 and the second axis 18 intersect. The second axis 18 in this case extends above the support and does not intersect it.

In combination with a movable machining tool, which is also able to rotate and/or pivot around at least one axis, it is possible to achieve a machinability of the load 10 in various ways.

The support 20 is positioned in rotary fashion on a bridge unit 36 of the moving system 30. The bridge unit 36 can be pivoted around the second axis 18, with the support 20 and first axis 16 being pivoted along with it. The support 20 in turn can be rotated around the first axis 16 relative to the bridge unit 36. The first electronically controlled drive unit 22 is positioned in the bridge unit 36. The second electronic drive unit 24 is positioned outside the bridge unit 36 and is stationary relative to the machine tool 14.

In general, however, other positions of the support 20, the axes 16, 18, and the electronically controlled drive units 22, 24 are possible according to the invention. The support 20 can, for example, be positioned eccentrically relative to the first axis 16. Alternatively or in addition, the second axis 18 can extend through the support 20 and particularly through its center of gravity 32. In addition, the second electronically controlled drive unit 24 can also be positioned under the support 20. The embodiment of the moving system 12 in such a way that it comprises a swivel/rotation table 30 is thus only an example.

Figure 2:
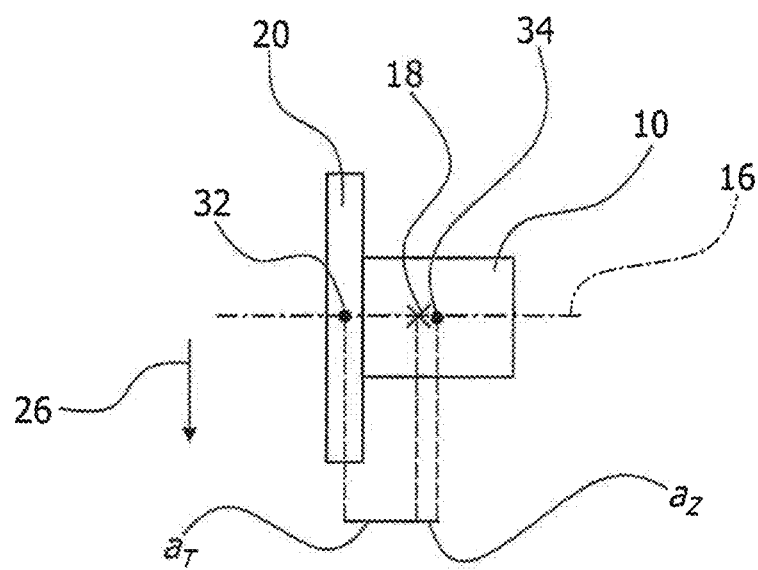
FIG. 2 shows a schematic side view of a support of the moving system with a load in a rotated position.

In FIG. 2, the support 20 with the load 10 is schematically depicted in a position that is pivoted by 90° relative to the home position shown in FIG. 1. In the home position, the first axis 16 is positioned parallel to a direction of gravity 26. In the position shown in FIG. 2, however, the first axis 16 is positioned perpendicular to the direction of gravity 26. The position shown in FIG. 2 is reached by pivoting the support 20 and the bridge unit 36 around the second axis 18. As is apparent in FIG. 2, the second axis 18 does not extend through the center of gravity 32 of the support 20. In the case shown, the second axis 18 also does not extend through a center of gravity 34 of the load; this depends on the type and geometry of the load. In most cases, the second axis 18 will also not extend through a shared center of gravity of the support 20 and the load 10. With a pivoting of the support 20 and the bridge unit 36, torques therefore occur that are dependent on a pivot angle.

Figure 3:
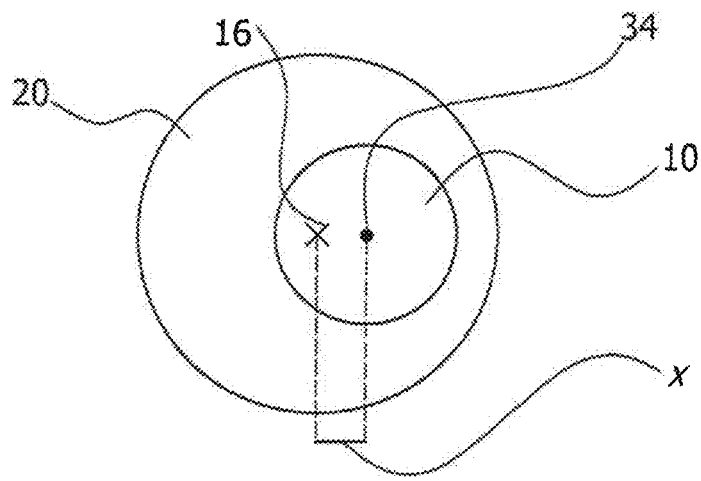
FIG. 3 shows a schematic top view of the support with the load.

In FIG. 3, the support 20 with the load 10 is schematically depicted in a top view, seen parallel to the first axis 16. In the case shown, the load 10, which is depicted as cylindrical by way of example, but can have any desired geometry, is positioned on the support 20 eccentrically relative to the axis 16. Such a positioning can occur due to imprecise positioning, due to intentional positioning, and/or due to the asymmetrical geometry of the load 10, which is the most frequent case in actual use. In particular, the load 10, as in the case shown, can be positioned on the support 20 in such a way that the first axis 16 does not extend through the center of gravity 34 of the load. An eccentricity of this kind causes corresponding torques to occur during a rotation of the support 20 around the first axis 16.

A mass and a center of gravity location of the load 10 can then be determined as follows. The method described below, in the case shown, is performed by the control unit 28 by means of suitable control and processing of the determined values.

According to the invention, a total moment of inertia and a holding torque with regard to the first axis 16 are determined in a state of the support 20 in which it is loaded with the load 10. A total moment of inertia and a holding torque with regard to the second axis 18 are also determined in the loaded state. The mass and the center of gravity location of the load 10 are then determined based on the total moments of inertia and the holding torques with regard to the first axis 16 and the second axis 18.

The control unit 28 is equipped to take the thus-determined mass and center of gravity location of the load 10 into consideration when moving and/or positioning the load 10. In this case, corresponding operating currents of the electronically controlled drive units 22, 24 are chosen in such a way that resulting load-dependent forces and holding torques can be compensated for so that a high precision movement control can be achieved.

According to the method, the total moments of inertia and the holding torques are determined from variables that are available in control loops of the electronically controlled drive units 22, 24 without a use of additional sensors. In the case shown, this variable includes an operating current, a rotation position, a rotation speed, and/or an acceleration time.

The holding torque of the first axis 16 is determined in a position of the first axis 16 in which the holding torque of the first axis 16 is at its maximum. This occurs in a position of the first axis 16 in which it is positioned perpendicular to the direction of gravity 26. As is apparent in FIG. 3, in this position, the holding torque depends on an angular position of the load 10. When the support 20 is rotated around the first axis 16, the holding torque is at its maximum when the distance between the center of gravity 34 of the load 10 and the first axis 16 perpendicular to the direction of gravity 26 is at its maximum, and is at its minimum when the center of gravity 34 of the load 10 and the first axis 16 are aligned relative to the direction of gravity 26.

The holding torque of the second axis 18 is determined in a position of the second axis 18 in which the holding torque of the second axis 18 is at its maximum. This position is also dependent on the position of the center of gravity 34 of the load 10 and on the position of the center of gravity 32 of the support 20 or bridge unit 26 with regard to the second axis 18. Typically, the holding torque of the second axis 18 is at its maximum when the first axis 16 is positioned perpendicular to the direction of gravity 26.

In order to determine the respective total moment of inertia, an acceleration torque around the respective axis 16, 18 is determined in the loaded state of the support 20 by rotating the load 10 around the respective axis 16, 18. The acceleration torque in this case is determined at a constant operating current.

For the first axis 16, this can be carried out in a position in which the first axis 16 is positioned parallel to the direction of gravity 26. But according to the invention, a determination is also possible in the perpendicular position.

For the determination of the mass and the center of gravity location, at least one stored value is used, which characterizes the unloaded support 20. Possibilities for this include moments of inertia of the support 20 relative to the axes 16, 18 as well as its mass, its geometry, its density distribution, and the like.

In addition, in a calibration step, which is performed in an unloaded state of the support 20, at least one reference value is determined, which is taken into consideration when determining the mass and the center of gravity location in the loaded state. In this case, a reference value is determined for friction losses that occur with a rotation of the support 20. The values that result from this can be derived from values that are determined in the loaded state in order to correspondingly take friction losses into account. The calibration step can take place when putting the moving system 12 into operation for the first time. In addition, other calibration steps can be carried out between uses of the moving system 12, for example in order to take into account a chronological change in the at least one reference value.

An eccentricity of the load 10 is determined by approaching at least three different angular positions for at least one of the axes 16, 18 and determining a respective holding torque for each. These holding torques are then used to determine the eccentricity. In the case shown, it is possible to select a number of different angular positions that make it possible to adjust a precision of the determination of the eccentricity.

With a use of the moving system 12 for the positioning of the load 10, the mass of the load 10 and/or its center of gravity location can be determined between machining steps and without a change of the loading state of the load 10, depending on the desired extent of machining. If, for example, a rough machining is performed in a first machining step during which a larger quantity of material is removed, the mass and the center of gravity location of the roughly machined load 10 can then be determined again. A subsequent fine machining can then be performed with a high precision since a positioning is carried out based on a precise determination of the mass and the center of gravity location of the roughly machined load 10.

In this case, the mass and the center of gravity location are determined based on the following four fundamental equations:

$$M_{2,Halte} = F_T \times a_T - F_Z \times a_Z \quad (1)$$

where $M_{2,Halte}$ is the holding torque of the second axis 18, $F_T$ is the weight of the unloaded support 20, $a_T$ is the distance between the center of gravity 32 of the support 20 and the second axis 18, $F_Z$ is the weight of the load 10, and $a_Z$ is the distance between the center of gravity 34 of the load 10 and the second axis 18 (see FIG. 2).

$$J_1 = J_{1,T} + J_{1,Z} \quad (2)$$

where $J_1$ is the total moment of inertia with regard to the first axis 16, $J_{1,T}$ is the moment of inertia of the unloaded support 20 with regard to the first axis 16, and $J_{1,Z}$ is the moment of inertia of the load 10 with regard to the first axis 16.

$$J_2 = J_{2,T} + J_{2,Z} \quad (3)$$

where $J_2$ is the total moment of inertia with regard to the second axis 18, $J_{2,T}$ is the moment of inertia of the unloaded support 20 with regard to the second axis 18, and $J_{2,Z}$ is the moment of inertia of the load 10 with regard to the second axis 18.

$$M_{1,Halte} = F_Z \times x \quad (4)$$

where $M_{1,Halte}$ is the holding torque of the first axis 16 and x is the distance between the center of gravity 34 of the load 10 and the first axis 16 (see FIG. 3).

In the present case, a mass and a moment of inertia of the bridge unit 26 are already taken into account in the control of the electronically controlled drive units 22, 24 by the control unit 28.

Figure 4:
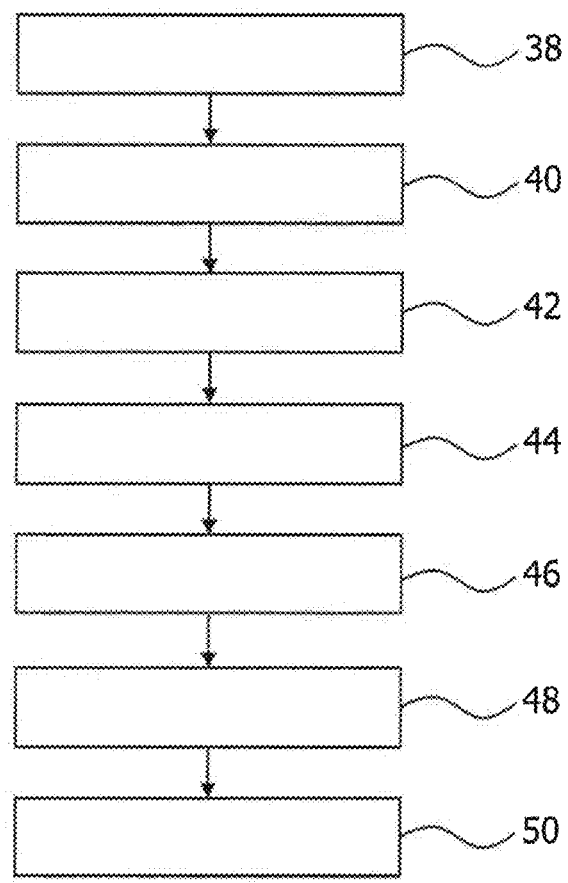
FIG. 4 shows a schematic flowchart of a method for determining the mass and the center of gravity location of a load of a moving system.

The sequence of a method according to the invention for determining the mass and the center of gravity location of the load 10 is schematically depicted in FIG. 4.

In a first method step 38, a calibration step is performed with an unloaded support 20. In this connection, frictional torques of the first axis 16 and second axis 18 are determined.

The first method step 38 can be performed independently of the other method steps, for example upon initial placement into service or after a change of the support 20. The remaining method steps are performed in a loaded state of the support 20.

In a second method step 40, a position of the maximum holding torque of the first axis 16 is determined by determining a power consumption of the electronically controlled drive unit 22 while the support 20 and the load 10 mounted thereon are being rotated around the first axis 16. This can take place in a position in which the first axis 16 is positioned perpendicular to the direction of gravity 26. Alternatively, the position of the maximum holding torque of the first axis 16 can be determined through rotation around both axes 16, 18. The holding torque of the first axis 16 is then determined in the position of the maximum holding torque of the first axis 16.

In a third method step 42, a position of the maximum holding torque of the second axis 18 is determined by determining a power consumption of the second electronically controlled drive unit 24 while the support 20 and the load 10 mounted thereon are being rotated around the second axis 18. This can take place in any position with regard to the first axis 16. Alternatively, the position of the maximum holding torque of the second axis 18 can be determined through rotation around both axes 16, 18. Then the holding torque of the second axis 18 is determined in the position of the maximum holding torque of the second axis 18.

In a fourth method step 44, the total moment of inertia with regard to the first axis 16 is determined through rotation around the first axis 16 with a predetermined operating current of the electronically controlled drive unit 22.

In a fifth method step 46, the total moment of inertia with regard to the second axis 18 is determined through rotation around the second axis 18 with a predetermined operating current of the second electronically controlled drive unit 24.

In a sixth method step 48, the eccentricity of the load 10 is determined, as described above, by approaching at least three different angular positions relative to the corresponding axes 16, 18.

In a seventh method step 50, the mass and the center of gravity location of the load 10 are calculated based on the above equations and through the use of reference values determined during the calibration step as well as the at least one stored value that characterizes the unloaded support 20.

The above-described sequence in which the method steps 38-50 are performed should be understood here as only an example. If need be, individual steps can be skipped/omitted or the steps can be performed in another sequence.

The determined mass and the determined center of gravity location are taken into consideration in a subsequent position control by the control unit 28 so that a high degree of precision can be achieved. At least some of the method steps, as mentioned above, can also be performed as needed between machining steps in order, in the case of changes in the load 10, to be able to correspondingly compensate for these.

The invention claimed is:

1. A method for determining the mass and the center of gravity location of a load of a moving system so that resulting load-dependent forces and holding torques can be compensated for to allow precision movement control of the load, the method comprising:
providing a machine tool having a moving system comprising a support for accommodating the load, wherein the support is structured to rotate around a first axis and a second axis, wherein the machine tool comprises electronically controlled drive units for rotating the support around the first axis and around the second axis, the moving system further comprising a control unit in operable communication with the electronically controlled drive units;
determining using the control unit a total moment of inertia and a holding torque for the first axis in a loaded state;
determining using the control unit a total moment of inertia and a holding torque for the second axis in the loaded state;
determining using the control unit the mass and the center of gravity location of the load relative to the support based on the total moments of inertia and the holding torques for the first axis and second axis; and
moving the load using the electronically controlled drive units, wherein movement of the load is based, at least in part, on the determined mass and the center of gravity location of the load relative to the support.

2. The method according to claim 1, wherein determining the total moments of inertia and the holding torques of at least one of the first axis or the second axis are determined based on at least one parameter that is available in control loops of the electronically controlled drive units without a use of additional sensors.

3. The method according to claim 2, wherein the at least one parameter comprises at least one selected from the group consisting of an operating current, a rotation position, a rotation speed, and an acceleration time.

4. The method according to claim 1, wherein the holding torque of the first axis is determined in a position of the first axis in which the holding torque of the first axis is at its maximum.

5. The method according to claim 4, wherein the holding torque of the first axis is determined when the first axis is positioned perpendicular to a direction of gravity.

6. The method according to claim 1, wherein determining the total moment of inertia for the first axis in the loaded state comprises determining, an acceleration torque around the first axis by rotating the load around the first axis.

7. The method according to claim 1, wherein at least one of the mass or the center of gravity location of the load is determined based on a stored value of at least one selected from the group consisting of (i) a moment of inertia of the unloaded support for the first axis, (ii) a moment of inertia of the unloaded support for the second axis, (iii) a mass of the unloaded support, and (iv) at least one geometric dimension of the support.

8. The method according to claim 1, further comprising performing at least one calibration step in an unloaded state of the support in which reference values are determined that are taken into consideration when determining the mass and the center of gravity location in the loaded state.

9. The method according to claim 1, further comprising:
for at least one of the first axis or second axis, approaching at least three different angular positions;
determining a respective holding torque for the at least one of the first axis or second axis for each of the at least three different angular positions; and
determining an eccentricity of the load based on the respective holding torques for each of the at least three different angular positions.

10. The method according to claim 1, further comprising determining at least one of the mass or the center of gravity location of the load between machining steps of a machining of the load without changing a loading state of the load.

11. The method according to claim 1, wherein the first axis comprises a rotation axis for the support and wherein the second axis comprises a pivot axis for the support.

12. The method according to claim 1, wherein the first axis and the second axis are positioned perpendicular to each other.

13. The method according to claim 1, wherein the first axis at least approximately intersects the second axis.

14. The method according to claim 1, wherein the holding torque of the second axis is determined in a position of the second axis in which the holding torque of the second axis is at its maximum.

15. The method according to claim 14, wherein the holding torque of the second axis is determined when the first axis is positioned perpendicular to a direction of gravity.

16. The method according to claim 1, wherein determining the total moment of inertia for the second axis in the loaded state comprises determining an acceleration torque around the second axis by rotating the load around the second axis.

17. A moving system of a machine tool for determining the mass and the center of gravity location of a load so that resulting load-dependent forces and holding torques can be compensated for to allow precision movement control of the load, comprising:
a support structured to accommodate a load and to rotate around at least a first axis and a second axis;
electronically controlled drive units for rotating the support around the first axis and around the second axis; and
a control unit in operable communication with the electronically controlled drive units, the control unit determining a mass and center of gravity location of the load, the control unit determining a total moment of inertia and a holding torque for the first axis in a loaded state; the control unit determining a total moment of inertia and a holding torque for the second axis in the loaded state; and the control unit determining the mass and the center of gravity location of the load relative to the support based on the total moments of inertia and the holding torques for the first axis and second axis; and wherein the electronically controlled drive units move the load based, at least in part, on the determined mass and the center of gravity location of the load relative to the support.

18. The moving system according to the claim 17, wherein after the mass and the center of gravity location of the load are determined, the control unit takes the mass and the center of gravity location of the load into consideration when the load is at least one of moved or positioned.

19. The moving system according to claim 17, comprising a swivel/rotation table, wherein the support is a workpiece table of the swivel/rotation table.

20. A machine tool having at least one moving system according to claim 17.

* * * * *